(12) United States Patent
Lin et al.

(10) Patent No.: US 10,191,838 B2
(45) Date of Patent: Jan. 29, 2019

(54) METHOD AND DEVICE FOR CHECKING INFLUENCE OF DELETING CACHE FILE, AND MOBILE TERMINAL

(71) Applicant: BEIJING KINGSOFT INTERNET SECURITY SOFTWARE CO., LTD., Beijing (CN)

(72) Inventors: Jianming Lin, Beijing (CN); Kangzong Zhang, Beijing (CN); Nan Zhang, Beijing (CN); Yong Chen, Beijing (CN); Ming Xu, Beijing (CN)

(73) Assignee: BEIJING KINGSOFT INTERNET SECURITY SOFTWARE CO., LTD, Beijing (CN)

( * ) Notice: Subject to any disclaimer, the term of this patent is extended or adjusted under 35 U.S.C. 154(b) by 198 days.

(21) Appl. No.: 15/322,968

(22) PCT Filed: Jun. 23, 2015

(86) PCT No.: PCT/CN2015/082116
§ 371 (c)(1),
(2) Date: Dec. 29, 2016

(87) PCT Pub. No.: WO2016/000546
PCT Pub. Date: Jan. 7, 2016

(65) Prior Publication Data
US 2017/0139813 A1    May 18, 2017

(30) Foreign Application Priority Data
Jun. 30, 2014  (CN) .......................... 2014 1 0308925

(51) Int. Cl.
*G06F 11/00*    (2006.01)
*G06F 11/36*    (2006.01)
(Continued)

(52) U.S. Cl.
CPC ........ *G06F 11/3664* (2013.01); *G06F 11/073* (2013.01); *G06F 11/079* (2013.01);
(Continued)

(58) Field of Classification Search
CPC .. G06F 11/073; G06F 11/079; G06F 11/3664; G06F 11/3688; G06F 11/3684; G06F 11/3692
See application file for complete search history.

(56) References Cited

U.S. PATENT DOCUMENTS 6,745,213 B2 *  6/2004  Seidl ................... G06F 12/0253
                                                  707/758
7,836,106 B2 * 11/2010  Willoughby ........ G06F 11/3672
                                                  707/705
(Continued)

FOREIGN PATENT DOCUMENTS

CN    101571821 A    11/2009
CN    102355515 A    2/2012

OTHER PUBLICATIONS

English translation of the International Written Opinion dated Nov. 3, 2016, for corresponding International Application No. PCT/CN2015/082116, filed Jun. 23, 2015.
(Continued)

*Primary Examiner* — Marc Duncan
(74) *Attorney, Agent, or Firm* — David D. Brush; Westman, Champlin & Koehler, P.A.

(57) ABSTRACT

A method and device for checking influence of deleting a cache file. The method includes: acquiring a program to be checked, and acquiring a click path set and a cache path set corresponding to the program to be checked, in which the click path set includes a plurality of click paths, and the cache path set includes a plurality of cache paths, each click path set corresponds to a cache path; acquiring a cache path to be checked in the cache path set, and deleting a cache file
(Continued)

to be checked from the cache path to be checked; according to a click path corresponding to the cache path to be checked, conducting a click simulation on the program to be checked; and according to an operating result of the program to be checked, acquiring the influence of deleting the cache file to be checked.

17 Claims, 8 Drawing Sheets

(51) Int. Cl.
*G06F 11/07* (2006.01)
*G06F 12/0891* (2016.01)

(52) U.S. Cl.
CPC .......... *G06F 11/36* (2013.01); *G06F 11/3684* (2013.01); *G06F 11/3688* (2013.01); *G06F 11/3692* (2013.01); *G06F 12/0891* (2013.01); *G06F 2212/60* (2013.01)

(56) References Cited

U.S. PATENT DOCUMENTS

| | | | | |
|---|---|---|---|---|
| 8,327,271 | B2* | 12/2012 | Miller | H04L 43/50 |
| | | | | 714/46 |
| 8,381,192 | B1* | 2/2013 | Drewry | G06F 11/3624 |
| | | | | 712/233 |
| 8,949,996 | B2* | 2/2015 | Kalman | G06F 11/3684 |
| | | | | 709/203 |
| 2004/0260678 | A1* | 12/2004 | Verbowski | G06F 11/008 |
| 2015/0134913 | A1* | 5/2015 | Huang | G06F 12/0833 |
| | | | | 711/135 |

OTHER PUBLICATIONS

International Search Report dated Sep. 23, 2015 for corresponding International Application No. PCT/CN2015/082116, filed Jun. 23, 2015.
Written Opinion of the International Searching Authority dated Sep. 23, 2015 for corresponding International Application No. PCT/CN2015/082116, filed Jun. 23, 2015.

* cited by examiner

METHOD AND DEVICE FOR CHECKING INFLUENCE OF DELETING CACHE FILE, AND MOBILE TERMINAL

CROSS-REFERENCE TO RELATED APPLICATION

This application is a US national phase application of an International Application No. PCT/CN2015/082116 filed on Jun. 23, 2015, which claims priority to and benefits of Chinese Patent Application Serial No. 201410308925.2, entitled "Method and device for checking influence of deleting cache file, and mobile terminal", filed with the State Intellectual Property Office of P. R. China on Jun. 30, 2014 by BEIJING KINGSOFT INTERNET SECURITY SOFTWARE CO., LTD., the contents of which are hereby incorporated by reference in their entireties.

FIELD

The present disclosure relates to a field of mobile terminal device, and more particularly to a method and a device for checking an influence of deleting a cache file, and a mobile terminal.

BACKGROUND

At present, in an application program or an application software for garbage collection, each cache path to be stored needs to be checked strictly, that is, it is necessary to check whether an influence would be made on a program by deleting a path catalog.

At present, in general, the checking process is performed manually. Specifically, the checking method is described as follows. In act (1), it is detected which function is related to the cache path generated in an application program. In act (2), the test catalog is deleted, the application program is re-opened, and the related function is clicked to observe whether a file of the catalog is generated again and whether an influence (such as a system crash, or a display error, etc.) is made on the application program by deleting the catalog. This may be caused by a conjectural mistake in the act (1), for example, if there is no relation between the function and the test catalog, each function of the application program needs to be used again. In act (3), the act (1) and the act (2) are repeatedly executed for all of the catalogs of the application program, and if it is determined that no influence is made on the program functionality by deleting the catalog, the catalog may be stored.

However, there is a problem that, the above checking method belongs to a manual checking method, in which the general checking work is operated by human, such that the above checking method has various drawbacks such as inefficiency, high labor cost and a requirement for lots of repetitive work.

SUMMARY

Embodiments of the present disclosure seek to solve at least one of the problems existing in the related art to at least some extent.

Accordingly, a first objective of the present disclosure is to provide a method for checking an influence of deleting a cache file. The method in the embodiments of the present invention may automatically detect whether a deleted cache file has an influence on a program by merely supplementing a device simply, thereby increasing the parallel processing efficiency and reducing labor costs.

A second objective of the present disclosure is to provide a device for checking an influence of deleting a cache file.

A third objective of the present disclosure is to provide a mobile terminal.

A fourth objective of the present disclosure is to provide a storage medium.

In order to achieve the above objectives, embodiments of a first aspect according to the present disclosure provide a method for checking an influence of deleting a cache file. The method includes: acquiring a program to be checked, and acquiring a click path set and a cache path set corresponding to the program to be checked, in which the click path set includes a plurality of click paths, and the cache path set includes a plurality of cache paths, and each click path set corresponds to a cache path; acquiring a cache path to be checked in the cache path set, and deleting a cache file to be checked from the cache path to be checked; according to a click path corresponding to the cache path to be checked, conducting a click simulation on the program to be checked; and according to an operating result of the program to be checked, acquiring the influence of deleting the cache file to be checked.

In order to achieve the above objectives, embodiments of a second aspect according to the present disclosure provide a device for checking an influence of deleting a cache file, including: a processor; and a memory, configured to store instructions executable by the processor; in which, the processor is configured to: acquire a program to be checked, and acquire a click path set and a cache path set corresponding to the program to be checked respectively, in which the click path set includes a plurality of click paths, and the cache path set includes a plurality of cache paths, and each click path set corresponds to a cache path; acquire a cache path to be checked in the cache path set, and delete a cache file to be checked from the cache path to be checked; conduct a click simulation on the program to be checked according to a click path corresponding to the cache path to be checked; and acquire the influence of deleting the cache file to be checked according to an operating result of the program to be checked.

In order to achieve the above objectives, embodiments of a third aspect according to the present disclosure provide a mobile terminal. The mobile terminal includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to: acquire a program to be checked, and acquiring a click path set and a cache path set corresponding to the program to be checked, in which the click path set includes a plurality of click paths, and the cache path set includes a plurality of cache paths, and each click path set corresponds to a cache path; acquire a cache path to be checked in the cache path set, and delete a cache file to be checked from the cache path to be checked; according to the click path corresponding to the cache path to be checked, conduct a click simulation on the program to be checked; and according to an operating result of the program to be checked, acquire an influence of deleting the cache file to be checked.

In order to achieve the above objectives, embodiments of a fourth aspect according to the present disclosure provide a storage medium configured to store an application program. The application program is configured to execute the method for checking an influence of deleting a cache file according to embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the accompanying drawings, in which.

DETAILED DESCRIPTION

Figure 1:
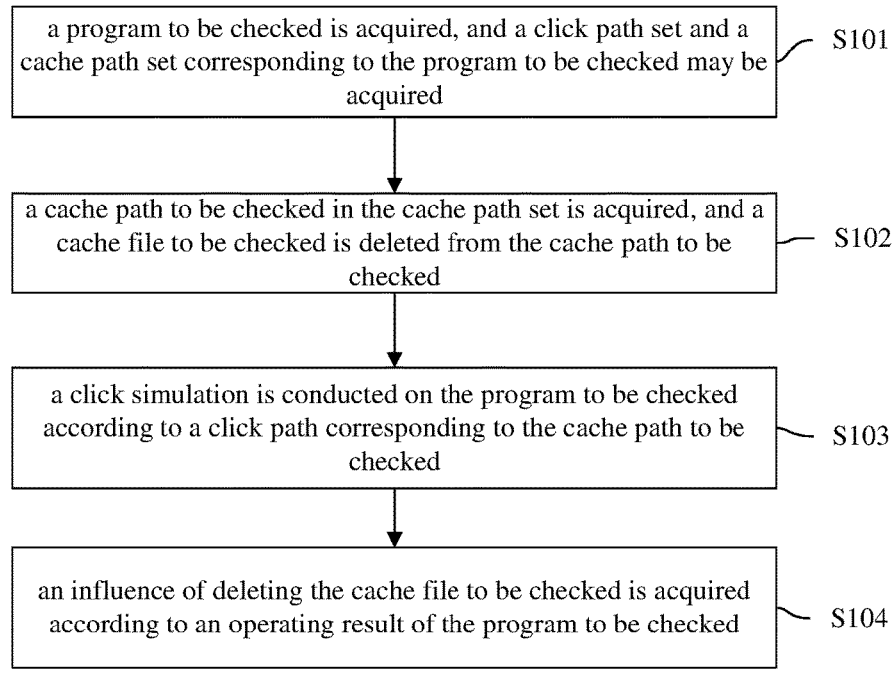
FIG. 1 is a flow chart of a method for checking an influence of deleting a cache file according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

The method and device for checking an influence of deleting a cache file, and the mobile terminal according to embodiments of the present disclosure will be described below with reference to drawings.

FIG. 1 is a flow chart of a method for checking an influence of deleting a cache file according to an embodiment of the present disclosure. As shown in FIG. 1, the method includes the followings.

In act S101, a program to be checked is acquired, and a click path set and a cache path set corresponding to the program to be checked are acquired.

In an embodiment of the present disclosure, the click path set includes a plurality of click paths, the cache path set includes a plurality of cache paths, and each click path set corresponds to a cache path.

For example, if a program to be checked is installed on a mobile terminal or a simulator, the program to be checked for this check may be acquired from the mobile terminal or the simulator, and then a click path set corresponding to the program to be checked may be acquired from a click path database. That is, the operation record of the automatic and manual click for the program to be checked may be stored in a memory card of the mobile terminal or the simulator, and a plurality of cache paths corresponding to the program to be checked may be acquired from a rule database.

In act S102, a cache path to be checked in the cache path set is acquired, and a cache file to be checked is deleted from the cache path to be checked.

In act S103, a click simulation is conducted on the program to be checked according to a click path corresponding to the cache path to be checked.

For example, a click sequence formed when the cache path to be checked is generated may be found out from the click path set, and the simulator is started for conducting a click playback according to the click sequence.

In act S104, an influence of deleting the cache file to be checked is acquired according to an operating result of the program to be checked.

Specifically, in an embodiment of the present disclosure, it may be checked whether the program to be checked crashes firstly. If the program to be checked crashes, it is determined that the program to be checked may crash due to the deletion of the cache file to be checked.

Figure 2:
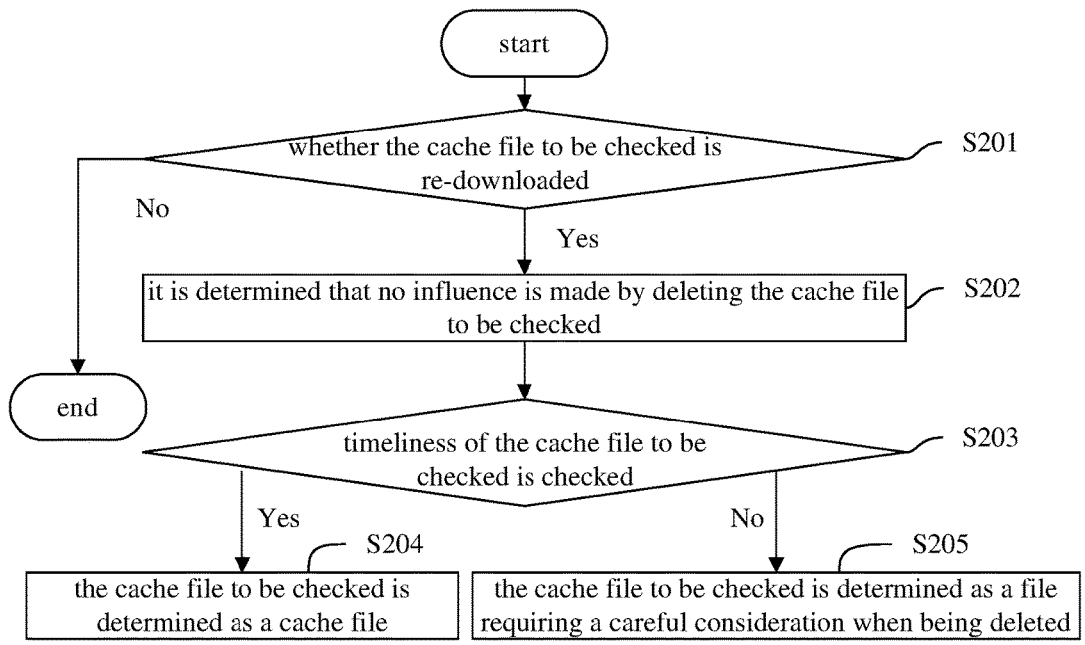
FIG. 2 is a flow chart of a process of acquiring an influence of deleting a cache file to be checked according to an embodiment of the present disclosure.

In another embodiment of the present disclosure, a process of acquiring an influence of deleting a cache file to be checked may include the followings, as shown in FIG. 2.

In act S201, it is checked whether the cache file to be checked is re-downloaded.

Specifically, it may be checked whether the cache file to be checked which has been deleted will be re-downloaded from the Internet when a click simulation is conducted on the program to be checked according to the click path corresponding to the cache path to be checked.

It should be noted that in an embodiment of the present disclosure, if the cache file to be checked is not re-downloaded, it may be determined that an influence is made by deleting the cache file to be checked.

In act S202, if the cache file to be checked is re-downloaded, it is determined that no influence is made by deleting the cache file to be checked.

In act S203, a timeliness of the cache file to be checked may be checked after checking that the cache file to be checked is re-downloaded.

It should be noted that the timeliness refers to an attribute indicating that the cache file to be checked is valuable for making decision only within a certain period of time. Specifically, it is checked whether the cache file to be checked is called within a preset time period firstly. If the cache file to be checked is called within the preset time period, it may be determined that the cache file to be checked does not have timeliness. If the cache file to be checked is not called within the preset time period, it may be determined that the cache file to be checked has timeliness. In an embodiment of the present disclosure, the cache file to be checked which has timeliness may include a news file, a shopping file, an information file etc.

In other words, after a certain period of time (a default threshold is two days), the cache file to be checked may be checked again, and a file access and a click playback of the program to be checked may be monitored through a hook function, so as to check whether the program to be checked would access to the cache file to be checked again. If the program to be checked does not access to the cache file to be checked again, it is determined that the cache file to be checked has timeliness.

In act S204, if the cache file to be checked has timelines, the cache file to be checked is determined as a cache file.

In act S205, if the cache file to be checked doesn't have timelines, the cache file to be checked is determined as a file requiring a careful consideration when being deleted.

In an embodiment of the present disclosure, the file requiring a careful consideration when being deleted may be understood as resource which may be re-downloaded or be re-accessed, such as a social head portrait or the like.

Therefore, the influence of deleting a cache file may be acquired through the above process, and the process of acquiring the influence of deleting a cache file is refined, and the accuracy of the checking result may be improved.

The method for checking an influence of deleting a cache file according to embodiments of the present disclosure may acquire a click path set and a cache path set corresponding to the program to be checked, and acquire a cache path to be checked in the cache path set and delete a cache file to be checked from the cache path to be checked thereafter, and according to the click path corresponding to the cache path to be checked, conduct a click simulation on the program to be checked, and according to the operating result of the program to be checked, acquire the influence of deleting the cache file to be checked. The whole checking process is implemented in a mobile terminal or a simulator, and it may be automatically detected whether a deleted cache file has an influence on a program by merely supplementing a device simply, thereby increasing the parallel processing efficiency and reducing labor costs.

Figure 3:
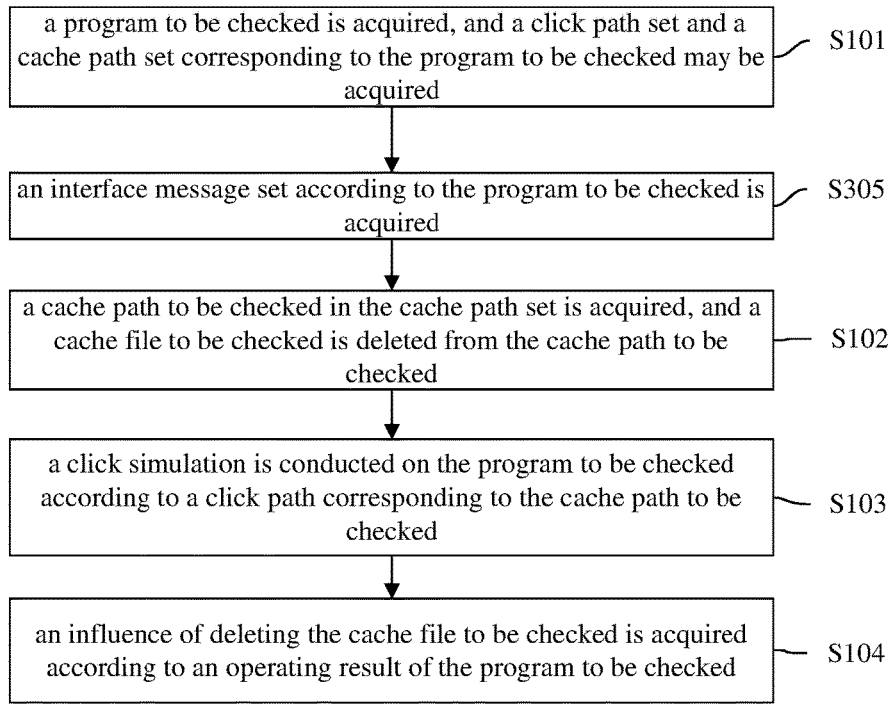
FIG. 3 is a flow chart of a method for checking an influence of deleting a cache file according to another embodiment of the present disclosure.

Alternatively, according to an embodiment of the present disclosure, the method for checking an influence of deleting a cache file may also include the followings, as shown in FIG. 3.

In act S305, an interface message set corresponding to the program to be checked is acquired.

In an embodiment of the present disclosure, the interface message set comprises a plurality of interface messages, and each interface message corresponds to a click path.

Specifically, a plurality of interface messages corresponding to the program to be checked may be acquired from a click path database after the program to be checked is acquired, and the above act S102 may be executed thereafter.

Figure 4:
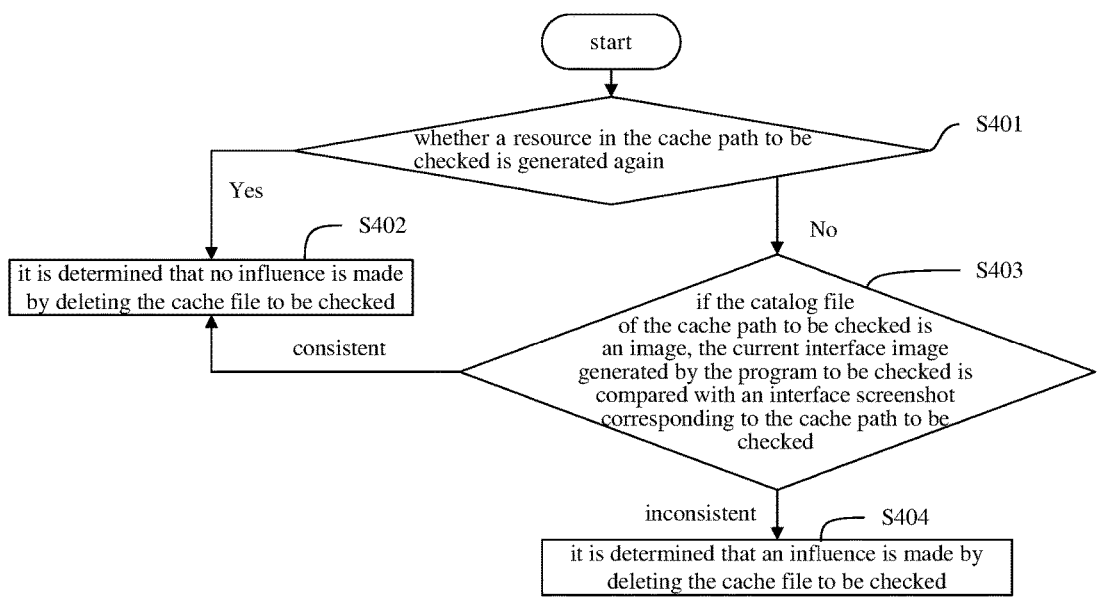
FIG. 4 is a flow chart of a process of acquiring an influence of deleting a cache file to be checked according to another embodiment of the present disclosure.

Alternatively, in an embodiment of the present disclosure, the above interface message includes an interface screenshot, and then the act of acquiring the influence of deleting the cache file to be checked according to the operating result of the program to be checked (the above act S104) specifically includes the followings, as shown in FIG. 4

In act S401, it is checked whether a resource in the cache path to be checked is generated again.

In act S402, if the resource in the cache path to be checked is generated again, it is determined that no influence is made by deleting the cache file to be checked.

In act S403, if the resource in the cache path to be checked cannot be generated again and a catalog file of the cache path to be checked is an image, a current interface image generated by the program to be checked is compared with an interface screenshot corresponding to the cache path to be checked.

It should be noted that in an embodiment of the present disclosure, if the current interface image generated by the program to be checked is consistent with the interface screenshot corresponding to the cache path to be checked, the above act S402 is executed, and it is determined that no influence is made by deleting the cache file to be checked.

In act S404, if the current interface image generated by the program to be checked is inconsistent with the interface screenshot corresponding to the cache path to be checked, it is determined that an influence is made by deleting the cache file to be checked.

For example, when the current interface image generated by the program to be checked is compared with the interface screenshot corresponding to the cache path to be checked, a single color lump is searched in the current interface image. For example, if the thumbnail image of the image which is cannot be generated again is deleted, the original thumbnail image interface would become all black or all white, and it may be determined that the deletion of the cache file to be checked makes an influence.

Therefore, the influence of deleting a cache file to be checked may be acquired by checking whether the resource in the cache path to be checked is generated again, such that the acquiring way may be enlarged, and the accuracy may be improved.

Figure 5:
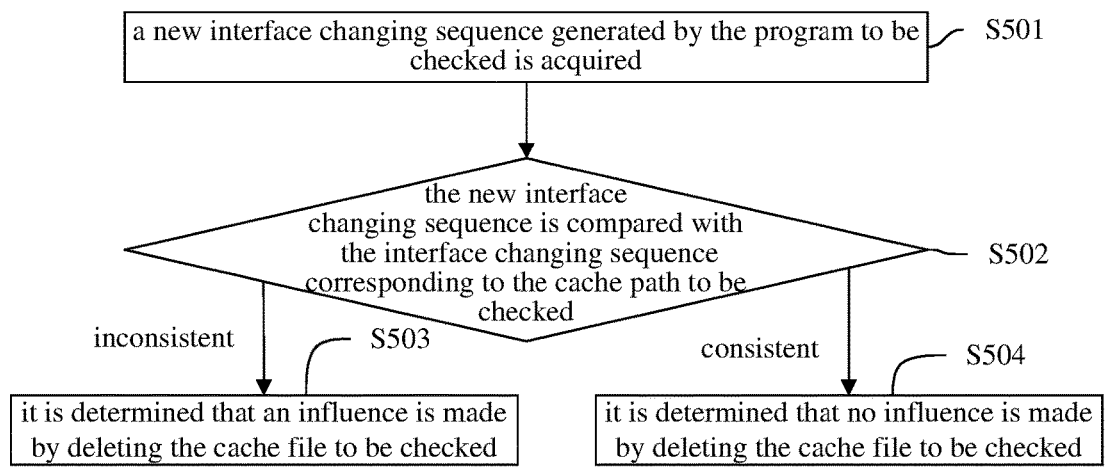
FIG. 5 is a flow chart of a process of acquiring an influence of deleting a cache file to be checked according to yet another embodiment of the present disclosure.

In another embodiment of the present disclosure, the above interface message may include an interface changing sequence, and then the act of acquiring the influence of deleting the cache file to be checked according to the operating result of the program to be checked (the above act S104) specifically includes the followings, as shown in FIG. 5.

In act S501, a new interface changing sequence generated by the program to be checked is acquired.

It should be noted that an interface changing sequence may be generated when different interfaces of the program to be checked are clicked.

In act S502, the new interface changing sequence is compared with the interface changing sequence corresponding to the cache path to be checked.

In act S503, if the new interface changing sequence is inconsistent with the interface changing sequence corresponding to the cache path to be checked, it is determined that an influence is made by deleting the cache file to be checked.

Specifically, when the new interface changing sequence is inconsistent with the interface changing sequence corresponding to the cache path to be checked, i.e., the sequence is changed, it may be determined that the deletion of the cache file to be checked makes an influence. For example, the program to be checked may pop up a dialog box with a keyword, such as lacking of resource or file corruption, or may jump to a different interface from the original interface.

In act S504, if the new interface changing sequence is consistent with the interface changing sequence corresponding to the cache path to be checked, it is determined that no influence is made by deleting the cache file to be checked.

Therefore, by comparing a new interface changing sequence generated by the program to be checked with the interface changing sequence corresponding to the cache path to be checked, the acquiring way may be enlarged, and the accuracy may be improved.

The method for checking an influence of deleting a cache file according to an embodiment of the present disclosure may acquire an interface message set corresponding to the program to be checked after the program to be checked is acquired. The acquiring way of the influence of deleting a cache file to be checked may vary with content included in the interface message. Thus, the acquiring way may be enlarged, and the accuracy of checking result may be improved significantly.

In order to make those skilled in the art understand the present disclosure more clearly, the process of checking the influence of deleting the cache file according to the present disclosure is illustrated as follows.

Figure 6:
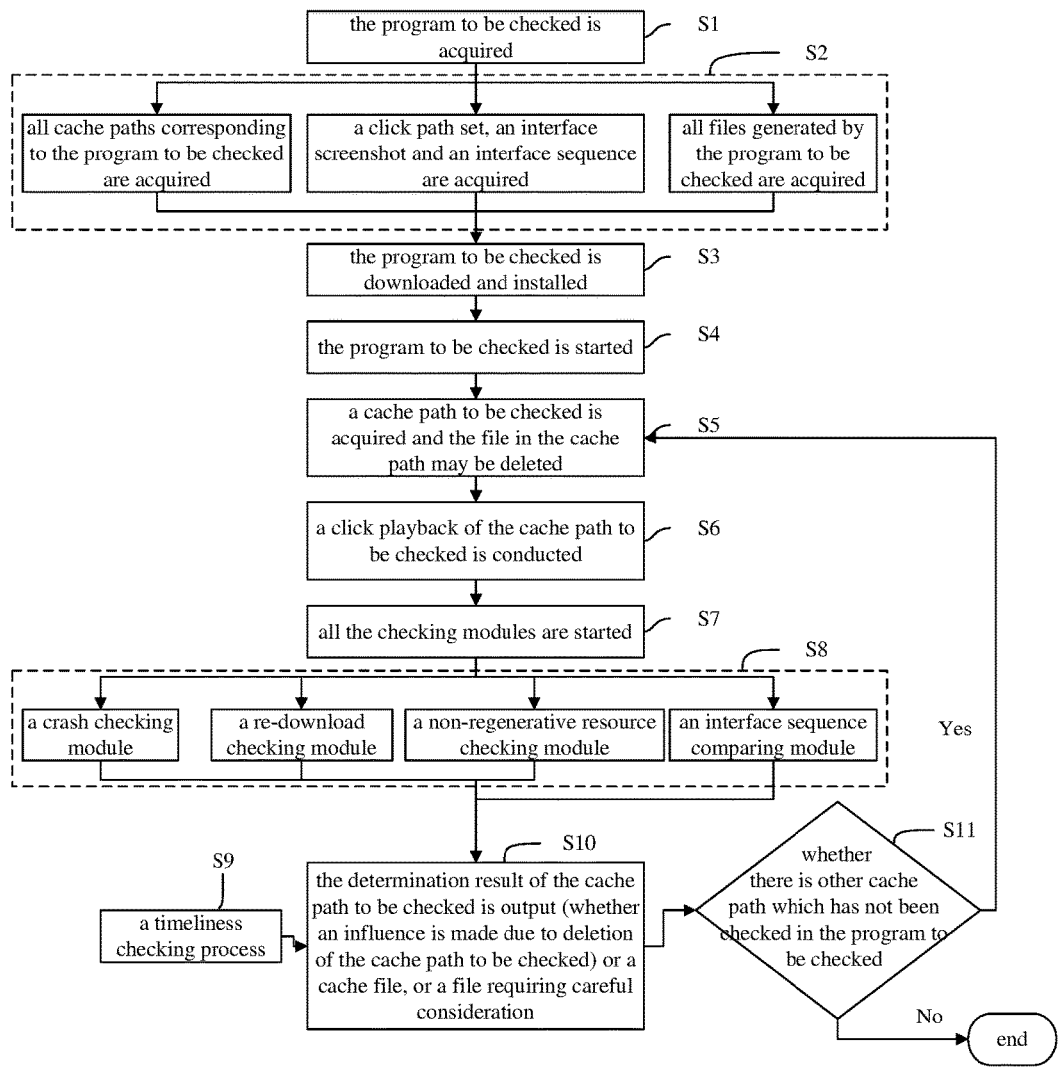
FIG. 6 is a flow chart of a process of checking an influence of deleting a cache file according to an embodiment of the present disclosure.

For example, assume that a checking system needs to be provided with a server, a mobile terminal, a simulator etc., in which the server may include a database, and each database stores data with different meanings. The checking process is described in detail below. As shown in FIG. 6, the program to be checked is acquired from a database firstly (S1). The corresponding data may be acquired respectively thereafter, i.e., all cache paths corresponding to the program to be checked may be acquired from the rule database, and a click path set, an interface screenshot and an interface sequence may be acquired from the click database. Thus all files generated by the program to be checked are acquired (S2). A mobile terminal of a simulator may download and install the program to be checked (S3). The program to be checked is started (S4). A cache path to be checked which needs to be deleted may be acquired and the cache file in the cache path may be deleted (S5). Then, a click sequence formed when the cache path is generated may be found out from the click path set obtained in the above act S2, and a click module may be started for conducting a click playback (S6). All the checking modules are started for checking during the click simulation on the program to be checked (S7). A crash checking module may check whether the program to be checked crashes, and a re-download checking module may check whether the cache file to be checked is re-downloaded, and a non-regenerative resource checking module may check whether the resource in the cache path to be checked is re-generated, and an interface sequence comparing module may compare whether a new interface changing sequence generated by the program to be checked is consistent in the interface changing sequence corresponding to the cache path to be checked (S8). Then the process enters to a timeliness checking step, that is, it is checked whether the file in the cache path to be checked has timeliness (S9). Finally, the determination result of the cache path to be checked may be outputted, such as a result indicating whether an influence is made by deleting the cache path to be checked, or whether the file is a cache file, or whether the file is a file requiring a careful consideration when being deleted and so on (S10). Then, it is determined whether there is other cache path which has not been checked in the program to be checked (S11), if yes, the act S5 may be executed continuously; or else, the process is terminated.

Additionally, the present disclosure also provides a device for checking an influence of deleting a cache file.

Figure 7:
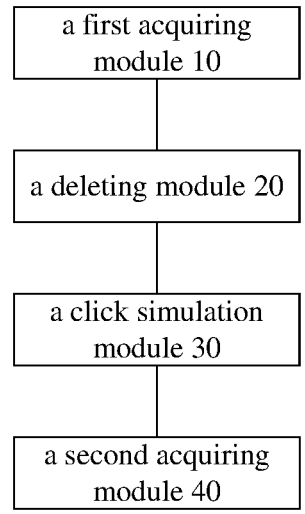
FIG. 7 is a block diagram of a device for checking an influence of deleting a cache file according to an embodiment of the present disclosure.

FIG. 7 is a block diagram of a device for checking an influence of deleting a cache file according to an embodiment of the present disclosure. As shown in FIG. 7, the device includes: a first acquiring module 10, a deleting module 20, a click simulation module 30 and a second acquiring module 40.

Specifically, the first acquiring module 10 is configured to acquire a program to be checked, and acquire a click path set and a cache path set corresponding to the program to be checked respectively. In an embodiment of the present disclosure, the click path set includes a plurality of click paths, the cache path set includes a plurality of cache paths, and each click path set corresponds to a cache path.

The deleting module 20 is configured to acquire a cache path to be checked in the cache path set, and delete a cache file to be checked from the cache path to be checked. The click simulation module 30 is configured to conduct a click simulation on the program to be checked according to a click path corresponding to the cache path to be checked. The second acquiring module 40 is configured to acquire the influence of deleting the cache file to be checked according to an operating result of the program to be checked.

Figure 8:
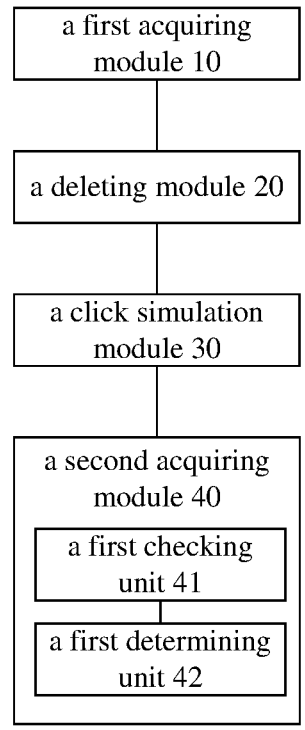
FIG. 8 is a block diagram of a device for checking an influence of deleting a cache file according to another embodiment of the present disclosure.

Preferably, in an embodiment of the present disclosure, as shown in FIG. 8, the second acquiring module 40 may include a first checking unit 41 and a first determining unit 42. Specifically, the first checking unit 41 is configured to check whether the program to be checked crashes. The first determining unit 42 is configured to determine that the program to be checked crashes cased by deleting the cache file to be checked if the first checking unit 41 checks that the program to be checked crashes.

Figure 9:
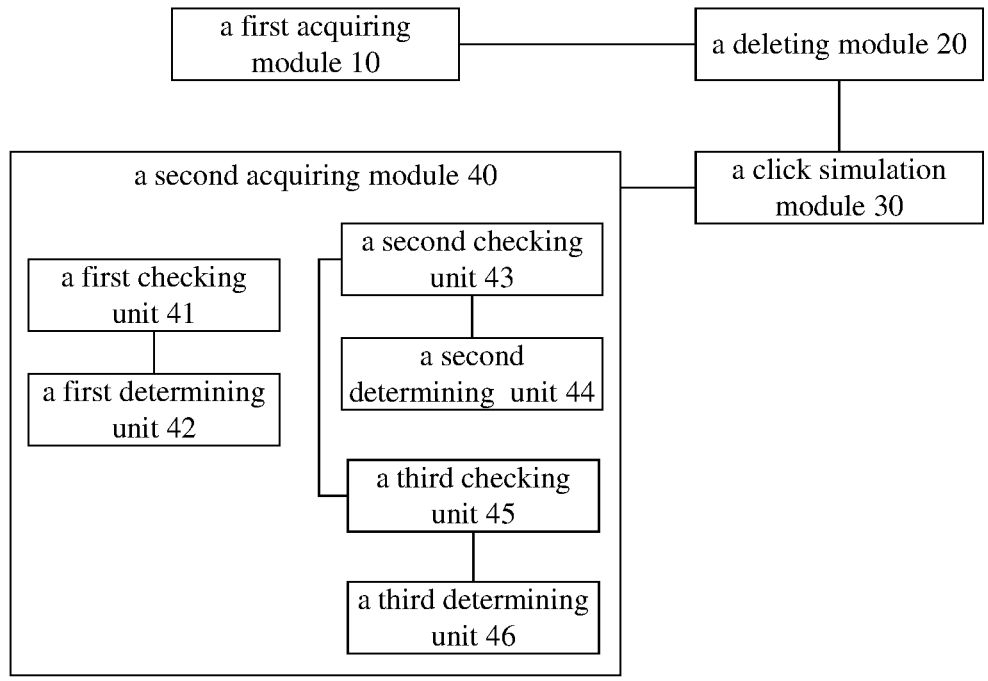
FIG. 9 is a block diagram of a device for checking an influence of deleting a cache file according to yet another embodiment of the present disclosure.

In another embodiment of the present disclosure, as shown in FIG. 9, the second acquiring module 40 may also include a second checking unit 43, a second determining unit 44, a third checking unit 45 and a third determining unit 46. Specifically, the second checking unit 43 is configured to check whether the cache file to be checked is re-downloaded. The second determining unit 44 is configured to determine that no influence is made by deleting the cache file to be checked if the second checking unit 43 checks that the cache file to be checked is re-downloaded. The third checking unit 45 is configured to check a timeliness of the cache file to be checked after the second checking unit 43 checks that the cache file to be checked is re-downloaded. The third determining unit 46 is configured to determine the cache file to be checked as a cache file if the third checking unit 45 checks that the cache file to be checked has the timeliness. In addition, in an embodiment of the present disclosure, the third determining unit 46 is also configured to determine the cache file to be checked as a file requiring a careful consideration when being deleted, if the third checking unit 45 checks the cache file to be checked does not have the timeliness.

Specifically, the third checking unit 45 may check whether the cache file to be checked is called within a preset time period, determine that the cache file to be checked does not have the timeliness if the cache file to be checked is called within the preset time period, determine that the cache file to be checked has the timeliness if the cache file to be checked is not called within the preset time period. Thus, the process of acquiring the influence of deleting a cache file is refined, and the accuracy of the checking result may be improved.

Figure 10:
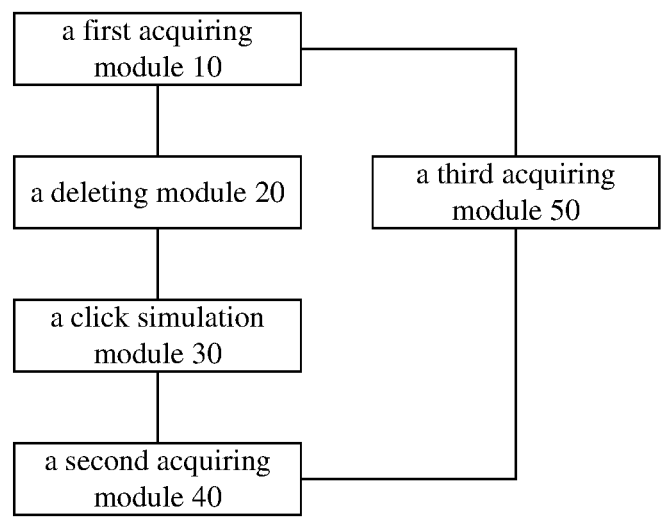
FIG. 10 is a block diagram of a device for checking an influence of deleting a cache file according to still another embodiment of the present disclosure.

Alternatively, according to an embodiment of the present disclosure, as shown in FIG. 10, the device for checking an influence of deleting a cache file may also include a third acquiring module 50. Specifically, the third acquiring module 50 is configured to acquire an interface message set corresponding to the program to be checked. In an embodiment of the present disclosure, the interface message set includes a plurality of interface messages, and each interface message corresponds to a click path.

Figure 11:
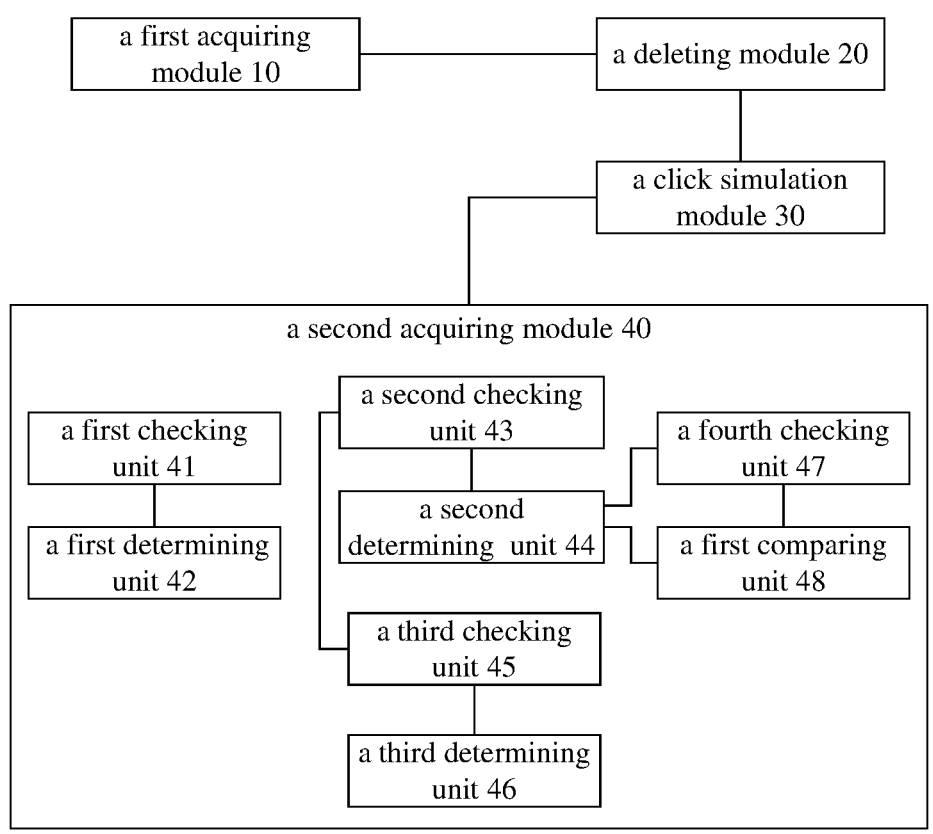
FIG. 11 is a block diagram of a device for checking an influence of deleting a cache file according to still yet another embodiment of the present disclosure.

Alternatively, in an embodiment of the present disclosure, the interface message may include an interface screenshot. As shown in FIG. 11, the second acquiring module 40 may also include a fourth checking unit 47 and a first comparing unit 48. Specifically, the fourth checking unit 47 is configured to check whether a resource in the cache path to be checked is generated again; to trigger the second determining unit 44 if the resource in the cache path to be checked is generated again; and to trigger the first comparing unit 48 if the resource in the cache path to be checked cannot be generated again.

The first comparing unit 48 is configured to compare a current interface image generated by the program to be checked with an interface screenshot corresponding to the cache path to be checked, if the fourth checking unit 47 checks that the resource in the cache path to be checked is unable to be generated again and a catalog file corresponding to the cache path to be checked is an image.

The second determining unit 44 is also configured to determine that an influence is made by deleting the cache file to be checked if the first comparing unit 48 determines that the current interface image generated by the program to be checked is inconsistent with the interface screenshot corresponding to the cache path to be checked. Therefore, the influence of deleting a cache file to be checked may be acquired by checking whether the resource in the cache path to be checked is generated again, and the acquiring way may be enlarged, and the accuracy may be improved.

Figure 12:
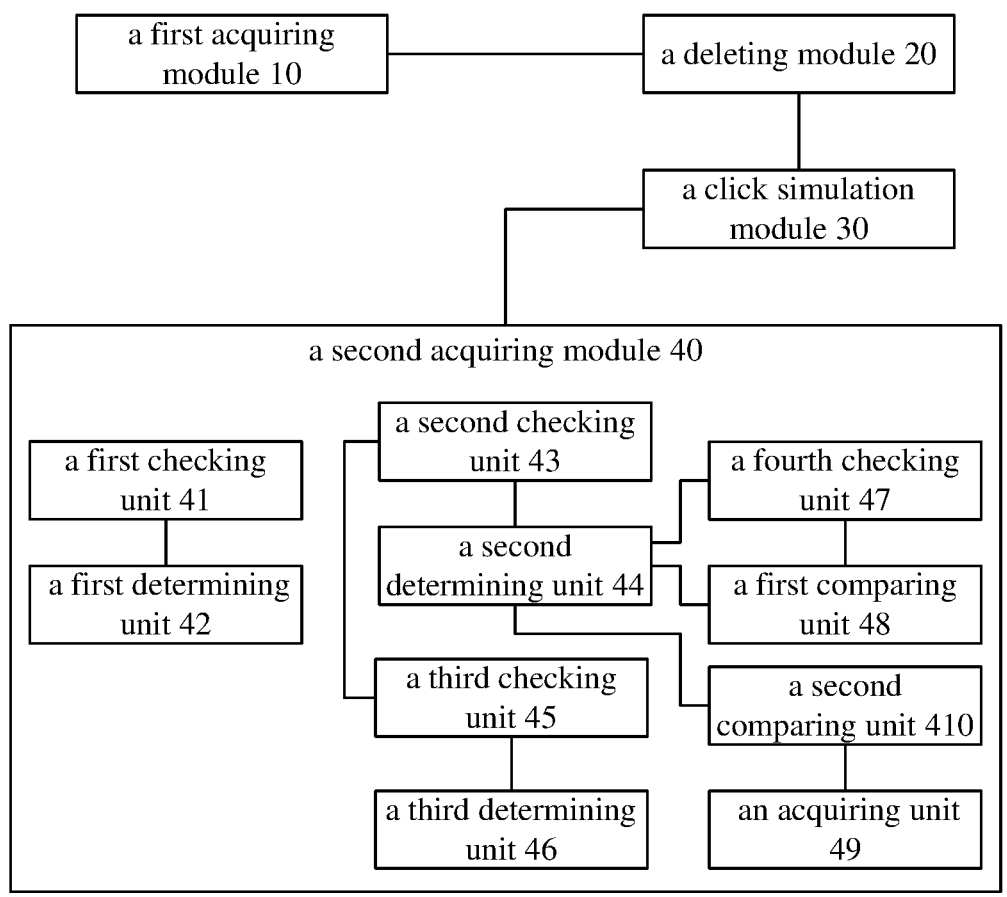
FIG. 12 is a block diagram of a device for checking an influence of deleting a cache file according to still yet another embodiment of the present disclosure.

In another embodiment of the present disclosure, the interface message may include an interface changing sequence. As shown in FIG. 12, the second acquiring module 40 may also include an acquiring unit 49 and a second comparing unit 410. Specifically, the acquiring unit 49 is configured to acquire a new interface changing sequence generated by the program to be checked. The second comparing unit 410 is configured to compare the new interface changing sequence with an interface changing sequence corresponding to the cache path to be checked. In addition, in an embodiment of the present disclosure, the second determining unit 44 is also configured to determine that an influence is made by deleting the cache file to be checked if the second comparing unit 410 compares that the new interface changing sequence is inconsistent with the interface changing sequence corresponding to the cache path to be checked. Therefore, the influence of deleting a cache file may be acquired by comparing the new interface changing sequence generated by the program to be checked with the interface changing sequence corresponding to the cache path to be checked, and the acquiring way may be enlarged, and the accuracy may be improved.

The device for checking an influence of deleting a cache file according to embodiments of the present disclosure may acquire a click path set and a cache path set corresponding to the program to be checked by the first acquiring module, acquire a cache path to be checked in the cache path set and delete a cache file to be checked from the cache path to be checked by the deleting module, conduct a click simulation on the program to be checked by the click simulation module according to the click path corresponding to the cache path to be checked, and acquire the influence of deleting the cache file to be checked by the second acquiring module according to the operating result of the program to be checked. The whole checking process is implemented in a mobile terminal or a simulator, and it may be automatically detected whether a deleted cache file has an influence on a program by merely supplementing a device simply, thereby increasing the parallel processing efficiency and reducing labor costs.

Additionally, the present disclosure also provides a mobile terminal. It's should be noted that, the mobile terminal may be a hardware device configured with various operating systems, such as a phone, a tablet computer, a personal digital assistant etc. The mobile terminal includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to perform following steps.

In act S101', a program to be checked is acquired, and a click path set and a cache path set corresponding to the program to be checked may be acquired.

The click path set includes a plurality of click paths, and the cache path set includes a plurality of cache paths, each click path set corresponding to a cache path.

In act S102', a cache path to be checked in the cache path set is acquired, and a cache file to be checked is deleted from the cache path to be checked.

In act S103', a click simulation is conducted on the program to be checked according to a click path corresponding to the cache path to be checked.

In act S104', an influence of deleting the cache file to be checked is acquired according to an operating result of the program to be checked.

The mobile terminal in a according to n embodiment of the present disclosure may acquire a click path set and a cache path set corresponding to the program to be checked, and acquire a cache path to be checked in the cache path set and delete a cache file to be checked from the cache path to be checked thereafter, and according to the click path corresponding to the cache path to be checked, conduct a click simulation on the program to be checked, and according to the operating result of the program to be checked, acquire the influence of deleting the cache file to be checked. The whole checking process is implemented in a mobile terminal or a simulator, and it may be automatically detected whether a deleted cache file has an influence on a program by merely supplementing a device simply, thereby increasing the parallel processing efficiency and reducing labor costs.

Additionally, the present disclosure also provides a storage medium configured to store an application program. The application program is configured to execute the method for checking an influence of deleting a cache file according to any of the embodiments of the present disclosure described above.

In an embodiment of the present disclosure, it should be understood that terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the acts of the progress. And the scope of a preferred embodiment of the present disclosure includes other implementations in which the order of execution may differ from that which is depicted or discussed in the flow chart, including in a basic same time manner or in reverse order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, if it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the acts in the method of the above embodiments can be implemented by instructing related hardware via programs, the program may be stored in a computer readable storage medium, and the program includes one act or combinations of the acts of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be read-only memories, magnetic disks, or optical disks.

Reference throughout this specification to "an embodiment", "some embodiments," "an embodiment", "a specific example," or "some examples," means that a particular feature, structure, material, or characteristic described in connection with the embodiment or example is included in at least an embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for checking an influence of deleting a cache file, comprising:
    acquiring a program to be checked, and acquiring a click path set and a cache path set corresponding to the program to be checked, wherein the click path set includes a plurality of click paths, and the cache path set includes a plurality of cache paths, and each click path set corresponds to a cache path;
    acquiring a cache path to be checked in the cache path set, and deleting a cache file to be checked from the cache path to be checked;
    conducting a click simulation on the program to be checked according to a click path corresponding to the cache path to be checked; and
    acquiring the influence of deleting the cache file to be checked according to an operating result of the program to be checked.

2. The method according to claim 1, wherein acquiring the influence of deleting the cache file to be checked according to an operating result of the program to be checked specifically comprises:
    checking whether the program to be checked crashes; and
    if the program to be checked crashes, determining that the program to be checked crashes because of deleting the cache file to be checked.

3. The method according to claim 1, wherein acquiring the influence of deleting the cache file to be checked according to an operating result of the program to be checked specifically comprises:
    checking whether the cache file to be checked is re-downloaded; and
    if the cache file to be checked is re-downloaded, determining that no influence is made by deleting the cache file to be checked.

4. The method according to claim 3, after checking the cache file to be checked is re-downloaded, further comprising:
    checking a timeliness of the cache file to be checked;
    if the cache file to be checked has the timeliness, determining the cache file to be checked as a cache file; and if the cache file to be checked doesn't have the timelines, determining the cache file to be checked as a file requiring a careful consideration when being deleted.

5. The method according to claim 4, wherein checking a timeliness of the cache file to be checked specifically comprises:
checking whether the cache file to be checked is called within a preset time period;
if the cache file to be checked is called within the preset time period, determining that the cache file to be checked does not have the timeliness; and
if the cache file to be checked is not called within the preset time period, determining that the cache file to be checked has the timeliness.

6. The method according to claim 1, further comprising:
acquiring an interface message set corresponding to the program to be checked, wherein the interface message set comprises a plurality of interface messages, and each interface message corresponds to a click path.

7. The method according to claim 6, wherein the interface message comprises an interface screenshot, wherein acquiring the influence of deleting the cache file to be checked according to an operating result of the program to be checked specifically comprises:
checking whether a resource in the cache path to be checked is generated again;
if the resource in the cache path to be checked is generated again, determining that no influence is made by deleting the cache file to be checked;
if the resource in the cache path to be checked is unable to be generated again and a catalog file corresponding to the cache path to be checked is an image, comparing a current interface image generated by the program to be checked with an interface screenshot corresponding to the cache path to be checked; and
if the current interface image generated by the program to be checked is inconsistent with the interface screenshot corresponding to the cache path to be checked, determining that an influence is made by deleting the cache file to be checked.

8. The method according to claim 6, wherein the interface message comprises an interface changing sequence, wherein acquiring the influence of deleting the cache file to be checked according to an operating result of the program to be checked specifically comprises:
acquiring a new interface changing sequence generated by the program to be checked;
comparing the new interface changing sequence with an interface changing sequence corresponding to the cache path to be checked; and
if the new interface changing sequence is inconsistent with the interface changing sequence corresponding to the cache path to be checked, determining that an influence is made by deleting the cache file to be checked.

9. A device for checking an influence of deleting a cache file, comprising:
a processor; and
a memory, configured to store instructions executable by the processor;
wherein, the processor is configured by the instructions to:
acquire a program to be checked, and acquire a click path set and a cache path set corresponding to the program to be checked respectively, wherein the click path set comprises a plurality of click paths, and the cache path set comprises a plurality of cache paths, and each click path set corresponds to a cache path;
acquire a cache path to be checked in the cache path set, and delete a cache file to be checked from the cache path to be checked;
conduct a click simulation on the program to be checked according to a click path corresponding to the cache path to be checked; and
acquire the influence of deleting the cache file to be checked according to an operating result of the program to be checked.

10. The device according to claim 9, wherein the processor is configured to acquire the influence of deleting the cache file to be checked according to an operating result of the program to be checked by acts of:
checking whether the program to be checked crashes; and
determining that the program to be checked crashes cased by deleting the cache file to be checked if the program to be checked crashes.

11. The device according to claim 9, wherein the processor is configured to acquire the influence of deleting the cache file to be checked according to an operating result of the program to be checked by acts of:
checking whether the cache file to be checked is re-downloaded; and
determining that no influence is made by deleting the cache file to be checked if the cache file to be checked is re-downloaded.

12. The device according to claim 11, wherein the processor is configured to acquire the influence of deleting the cache file to be checked according to an operating result of the program to be checked by acts of:
checking a timeliness of the cache file to be checked after determining the cache file to be checked is re-downloaded;
determining the cache file to be checked as a cache file if the cache file to be checked has the timeliness; and
determining the cache file to be checked as a file requiring a careful consideration when being deleted, if the cache file to be checked does not have the timeliness.

13. The device according to claim 12, wherein the processor is configured to check a timeliness of the cache file to be checked by acts of:
checking whether the cache file to be checked is called within a preset time period;
if the cache file to be checked is called within the preset time period, determining that the cache file to be checked does not have the timeliness; and
if the cache file to be checked is not called within the preset time period, determining that the cache file to be checked has the timeliness.

14. The device according to claim 9, wherein the processor is further configured to:
acquire an interface message set corresponding to the program to be checked, wherein the interface message set comprises a plurality of interface messages, and each interface message corresponds to a click path.

15. The device according to claim 14, wherein the interface message comprises an interface screenshot, wherein the processor is configured to acquire the influence of deleting the cache file to be checked according to an operating result of the program to be checked by acts of:
checking whether a resource in the cache path to be checked is generated again;

if the resource in the cache path to be checked is generated again, determining that no influence is made by deleting the cache file to be checked;

if the resource in the cache path to be checked is unable to be generated again and a catalog file corresponding to the cache path to be checked is an image, comparing a current interface image generated by the program to be checked with an interface screenshot corresponding to the cache path to be checked; and if the current interface image generated by the program to be checked is inconsistent with the interface screenshot corresponding to the cache path to be checked, determining that an influence is made by deleting the cache file to be checked.

16. The device according to claim 14, wherein the interface message comprises an interface changing sequence, wherein the processor is configured to acquire the influence of deleting the cache file to be checked according to an operating result of the program to be checked by acts of:

acquiring a new interface changing sequence generated by the program to be checked;

comparing the new interface changing sequence with an interface changing sequence corresponding to the cache path to be checked;

if the new interface changing sequence is inconsistent with the interface changing sequence corresponding to the cache path to be checked, determining that an influence is made by deleting the cache file to be checked.

17. A mobile terminal, comprising:

a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor is configured to execute a program corresponding to the executable program codes by reading the executable program codes stored in the memory so as to:

acquire a program to be checked, and acquiring a click path set and a cache path set corresponding to the program to be checked, in which the click path set includes a plurality of click paths, and the cache path set includes a plurality of cache paths, and each click path set corresponds to a cache path;

acquire a cache path to be checked in the cache path set, and delete a cache file to be checked from the cache path to be checked;

conduct a click simulation on the program to be checked according to a click path corresponding to the cache path to be checked; and acquire the influence of deleting the cache file to be checked according to an operating result of the program to be checked.

* * * * *